INVENTOR
Joseph C. Osterhout
BY 7 r. [signature]
ATTORNEY

Jan. 2, 1968 J. C. OSTERHOUT 3,361,923
LIGHTNING ARRESTOR MAGNETIC BLOWOUT GAP HAVING
RADIALLY POSITIONED ARC SPLITTER ELECTRODES
Filed Oct. 23, 1964 6 Sheets-Sheet 2

3,361,923
LIGHTNING ARRESTOR MAGNETIC BLOWOUT GAP HAVING RADIALLY POSITIONED ARC SPLITTER ELECTRODES

Joseph C. Osterhout, Bloomington, Ind., assignor to Westinghouse Electric Corporation, Pittsburgh, Pa., a corporation of Pennsylvania Filed Oct. 23, 1964, Ser. No. 405,945
11 Claims. (Cl. 313—231)

ABSTRACT OF THE DISCLOSURE

A current limiting spark gap for lightning arresters having electrodes disposed in a closed arcing chamber between insulating plates with an electrically floating runner electrode for dividing the arc and magnetic blowout means for moving the arc. The plates have channels formed in them for circulating gas in a manner to assist in moving the arc and to minimize the possibility of the arc restriking in the initial arcing region.

The present invention relates to lightning arresters and more particularly to magnetic blowout arrester spark gaps.

With the development of extra high voltage transmission lines it is becoming increasingly important that arresters be efficiently and economically constructed for operation with voltage ratings as high as 650 kv. or more. One approach to this objective in arrester design is to replace the standard spark gap with a magnetic blowout gap in which power follow current is limited in magnitude and duration (to less than a power half-cycle) by relatively high arc resistance and high arc voltage drop. The duty on the arrester valves or blocks connected in series with the magnetic blowout gap or gaps is thus lowered so as to enable the blocks to be used at a higher voltage. Economy can accordingly be achieved in the size and in the overall construction of the arrester.

The character of the structure and operation of the magnetic blowout gap is thus a key factor in the overall efficiency and economy sought for the arrester. It is improvement in this character toward which the principles of the present invention are directed. Thus, a magnetic blowout gap comprises a stack of insulative gap plates with an arc chamber formed between each pair of adjacent gap plates. The gap atmosphere can be air or other suitable gas but preferably is nitrogen. A pair of electrodes are disposed between each pair of adjacent gap plates and the electrodes are connected in series so as to form a plurality of series connected spark gaps preferably in a spiraling path about and along the axis of the plate stack. Preferably, an arc runner electrode is also provided between each pair of adjacent plates, and the electrodes are so formed and arranged geometrically with relation to the gap plates as to allow efficient arc starting, stretching and cooling and resultant improvement in efficiency including relatively higher resistance and voltage drop properties for the arc. Magnetic means are provided for driving the arcs from the starting to the stretched lengths in the respective arc chambers, and preferably the magnetic means comprise one or more gap-protected coils mounted in the stack and connected in the series spark gap circuit.

It is therefore an object of the invention to provide a novel magnetic blowout arrester gap which is constructed and operated with improved economy and efficiency.

Another object of the invention is to provide a novel magnetic blowout arrester gap in which power follow current is limited in magnitude and sharply limited in duration to a fraction of a power half-cycle.

A further object of the invention is to provide a novel magnetic blowout arrester gap in which relatively high resistance and relatively high voltage drop properties are provided for the arc.

It is an additional object of the invention to provide a novel magnetic blowout arrester gap in which arc stretching is achieved over a nearly peripheral or circumferential path about the gap.

Another object of the invention is to provide a novel magnetic blowout arrester gap in which efficient arc cooling is provided through efficient use of gap plate area or gap electrode area or both of these areas.

It is a further object of the invention to provide a novel magnetic blowout arrester gap in which efficient arc cooling is promoted through recirculating gas flow which by-passes the electrode sparkover region.

Another object of the invention is to provide a novel magnetic blowout arrester gap in which improved constancy is provided in arc starting through reduced electrode erosion in the electrode sparkover region.

Still another object of the invention is to provide a novel magnetic blowout arrester gap in which improved electrode stability is provided against current generated magnetic forces.

It is a further object of the invention to provide a novel magnetic blowout arrester gap in which improved gap stability is provided against electrode vaporization pressures.

These and other objects of the invention will become more apparent upon consideration of the following detailed description along with the attached drawings, in which.

Figure 16:
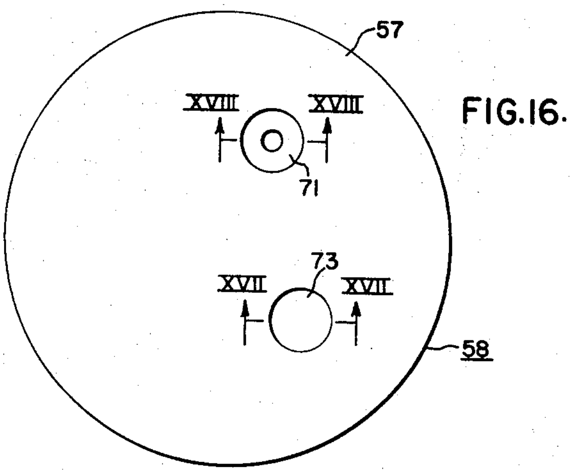
FIG. 16 shows a top plan view of another gap plate shown in the unit of FIG. 1 and associated with a magnetic drive coil included in the unit.
Figure 17:
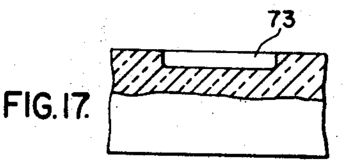
Figure 18:
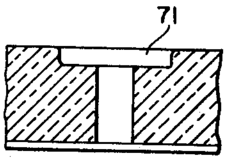
Figure 19:
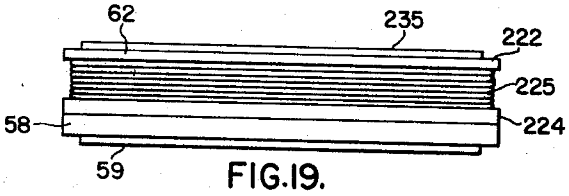

FIGS. 17 and 18 respectively show portions of sections taken along reference lines XVII—XVII and XVIII—XVIII of FIG. 16;

FIG. 19 shows an elevational view of the plate of

Figure 1:
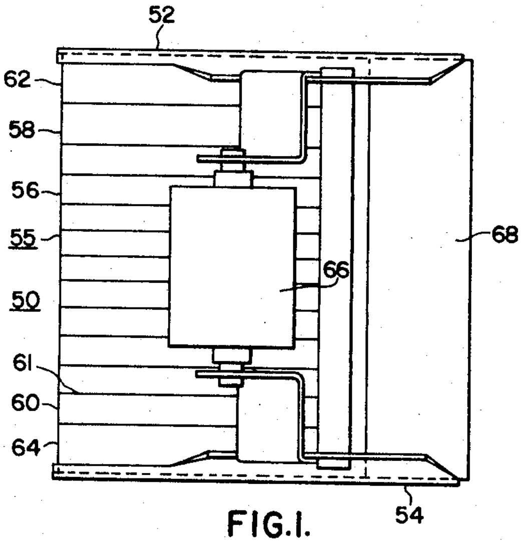
FIG. 1 is an elevational view of a magnetic blowout gap unit constructed in accordance with the principles of the present invention.
Figure 20:
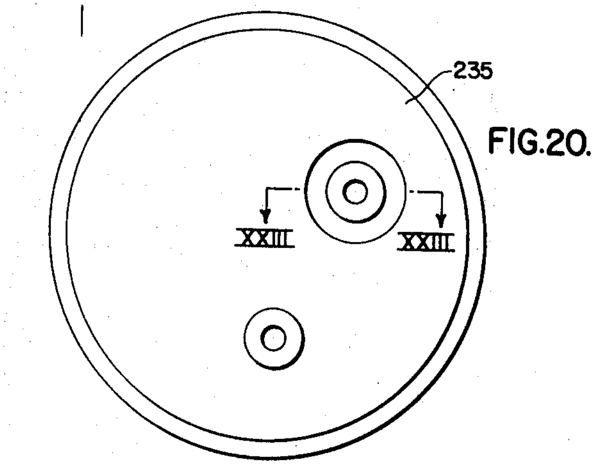
Figure 21:
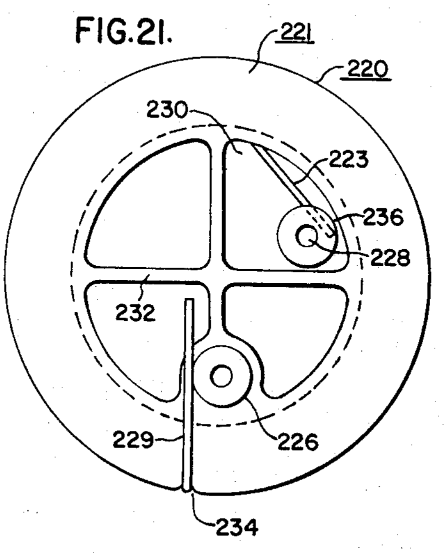
Figure 24:
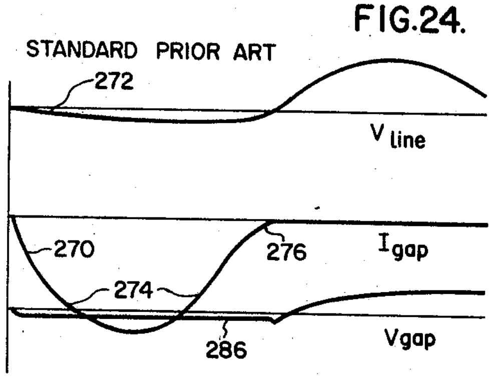
Figure 25:
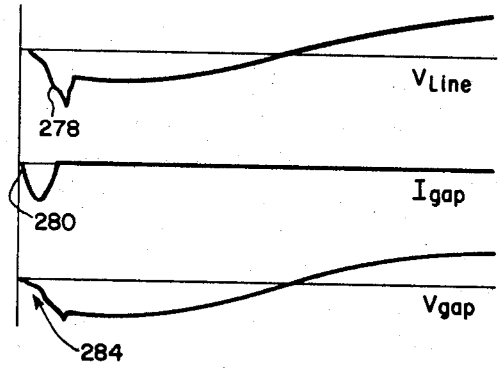
Figure 22:
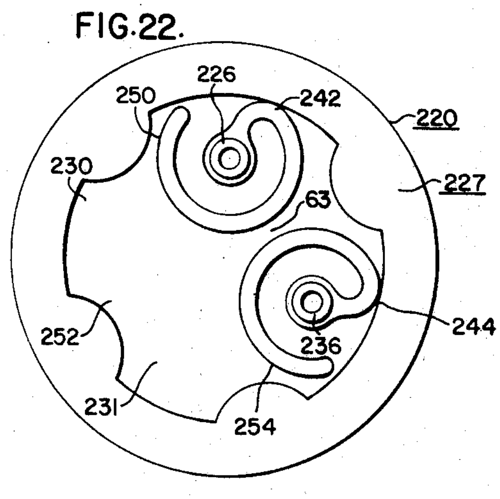
Figure 26:
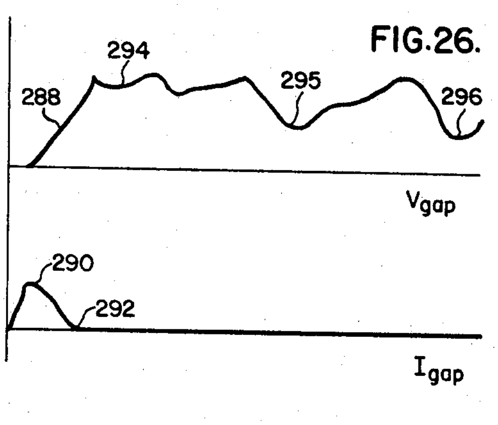
Figure 23:
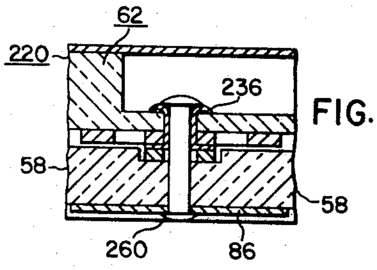

FIG. 16 in combination with a magnetic drive coil unit;

FIG. 20 shows a top plan view of the combination shown in FIG. 19;

FIG. 21 shows a top plan view of the magnetic drive coil unit shown in the combination of FIG. 19;

FIG. 22 shows a bottom plan view of the unit shown in FIG. 21;

FIG. 23 shows a portion of a section taken along the reference line XXIII—XXIII of FIG. 20;

FIGS. 24, 25 and 26 show respective graphical representations indicating the comparative performance of the gap unit of FIG. 1.

More specifically, there is shown in FIG. 1 a magnetic blowout arrester gap unit or module 50 constructed in accordance with the principles of the present invention. The gap unit 50 can, for example, have a voltage rating of 6 kv. and it can be combined with other identical units and disposed in an arrester housing in accordance with usual or other techniques to form a complete arrester device having the desired overall voltage rating.

The gap unit or gap 50 comprises top and bottom end terminal plates 52 and 54 between which there are disposed and retained in assembled relation a stack of gap plates 56, 58 and 60 and magnetic drive coil units 62 and 64. In addition, a capacitor 66 and a voltage grading resistor 68 can be disposed between the end plates 52 and 54 so as to be connected in electrical parallel with the stack 55. The grading resistor 68 cooperates with other such resistors in a complete arrester device to provide for optimum low frequency voltage distribution across the gaps 50. The capacitor 66 and other such capacitors provide for optimum high frequency voltage distribution across the gaps 50.

Figure 2:
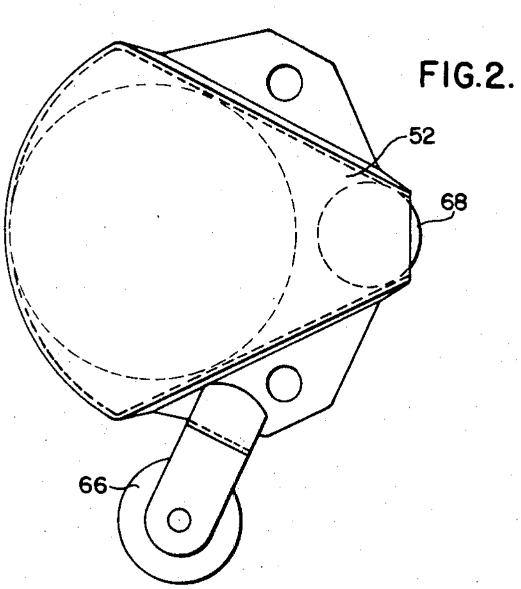
FIG. 2 is a top plan view of the unit shown in FIG. 1.
Figure 3:
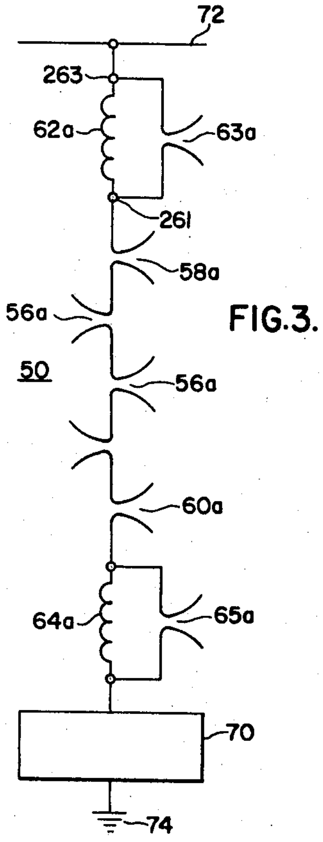
FIG. 3 is a schematic circuit diagram of the manner in which the gap unit of FIG. 1 is connected in an arrester device.

To clarify the manner in which the gap 50 is operated in an arrester device, there is shown in FIG. 3 a schematic circuit diagram of a single gap unit 50 in series circuit relationship with a valve or arrester block 70 between line 72, for which overvoltage protection is to be provided, and ground 74. As indicated, the gap 50 includes a plurality of series connected spark gaps 56*a* and a pair of magnetic drive coils 62*a* and 64*a* which are respectively protectively by-passed by gaps 63*a* and 65*a* having operating characteristics to be discussed more fully hereinafter. Because of the magnetic blowout and high arc resistance and voltage drop character of the gap 50, the arrester block 70 is subjected to lower duty operation and thus can be operated at higher voltages or can provide significantly more resistance in the arrester circuit than would otherwise be the case.

In FIGS. 4, 5, 14 and 15, gap plate and electrode components of the gap stack 55 are shown in greater detail. Thus, the gap plate 56 is provided with a top side 76 (FIG. 4) and a bottom side 78 (FIG. 5) which are respectively provided with a peripheral groove 80 and a peripheral ridge 82 such that the ridge 82 and the groove 80 of adjacent plates 56 form interfitting means which hold the gap plates 56 in stacked relation in the stack 55. The rib and groove interfit need not be sealed but it is preferably sufficiently tight to prevent rapid gas escape for reasons which will become more apparent subsequently. When so stacked, the top and bottom sides 76 and 78 of adjacent gap plates 56 form respective regions within which gap electrodes 84 and 86, runner electrode 88 and an arc chamber 90 are disposed. Preferably, the insulative gap plate 56 is formed from alumina or glass bonded mica but it can be formed from other suitable electrically insulative and heat resistant refractory or nonrefractory material.

The gap electrodes 84 and 86 are generally flat and elongated and preferably are identical. A fastener or rivet 92 or similar conductive securing means is employed to secure the electrodes 84 and 86 respectively on the top and bottom gap plate sides 76 and 78 and simultaneously to form a conductive path from the electrode 84 to the electrode 86 through gap plate opening 94. The electrodes 84 and 86 are respectively indexed in the location by vertically spaced top and bottom wall surfaces 96 and 97 and vertically spaced top and bottom wall surfaces 98 and 99 (FIGS. 14 and 15) which generally correspond in contour to confronting electrode arcuate edge surface portion 100 or 102 of electrode edge arcing surface 101 or 103. Additional retaining structure can be provided for the electrodes 84 and 86 as will subsequently be described.

Figure 14:
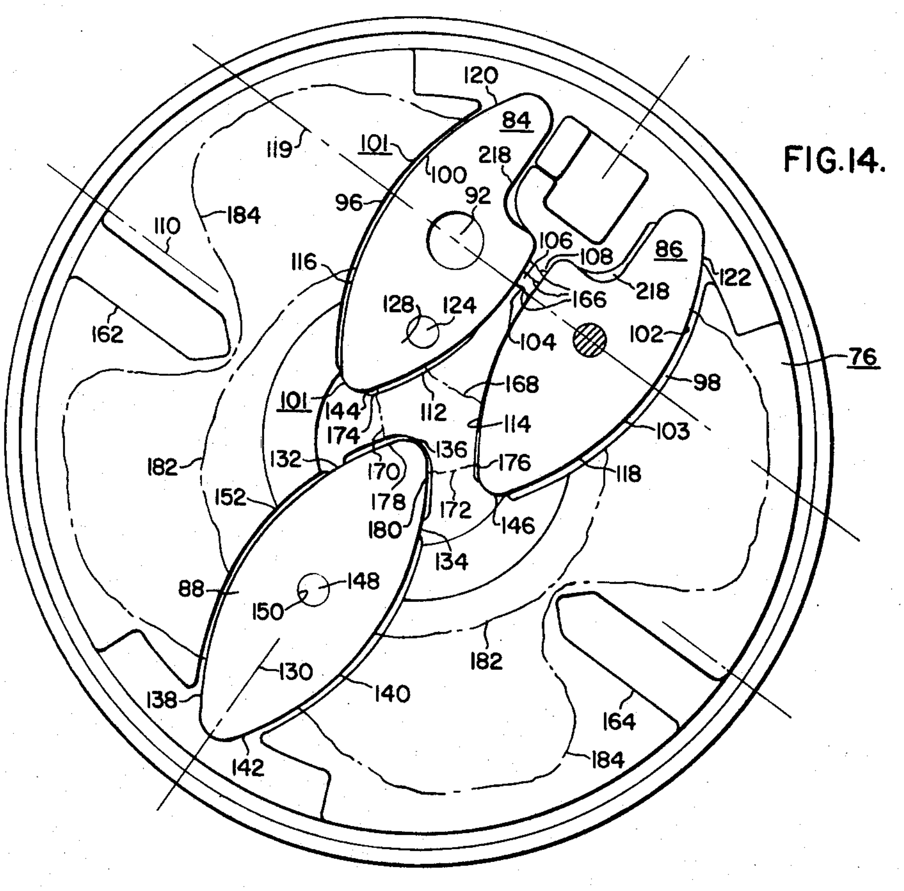
FIG. 14 shows a top plan view of the gap plate of FIG. 4 with electrodes secured thereto.

When a pair of gap plates 56 are assembled together, the gap electrode 86 secured (FIG. 15) to the bottom side 78 of the topmost gap plate 56 then is positioned substantially in a common plane with the gap electrode 84 on the top side 76 of the bottommost gap plate 56 as shown in FIG. 14.

Figure 13:
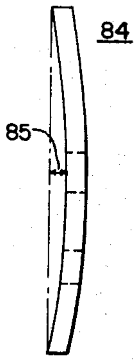
FIG. 13 shows a side view of a gap electrode employed in the gap unit of FIG. 1.

Gap plate spacing is preferably established by the electrodes 84 and 86 rather than by the ridge 82 and, for this purpose, each electrode is preferably provided with limited resilient bending capacity through limited but not excessive camber along its longitudinal dimension as indicated by the reference character 85 in FIG. 13.

The longitudinal dimension of each electrode 84 or 86 extends nearly from the peripheral ridge 82 and groove 80 to reference gap plate centerline 110 (FIG. 14) with a substantially perpendicular relationship between the longitudinal axes of the electrodes 84 and 86 and the centerline 110. A sparkover gap 104 is provided between electrode sparkover edge surface portions 106 and 108 respectively forming a part of the electrode arcing surfaces 101 and 103. The confronting electrode sparkover portions 106 and 108 in turn extend generally parallel with the electrode longitudinal axes and do so to a substantial extent, in this case about one-fourth of the total electrode length. The electrode sparkover portions 106 and 108 are thus substantially parallel to each other and substantial sparkover electrode area is provided in the sparkover region. An advantage is accordingly gained in that electrode erosion through excessive vaporization is restricted by the relatively large current flow cross-section available throughout the arc starting time period.

Respective electrode edge surface portions 112 and 114 of the arcing surfaces 101 and 103 extend from the sparkover edge portions 106 and 108 and diverge outwardly from each other toward the gap plate centerline 110. The divergence between the electrode edge portions 112 and 114 provides the basis for beginning arc stretching action in the chamber 90.

The outer arcuate edge surfaces 100 and 102 of the electrodes 84 and 86 generally include a first section or portion 116 and 118 which curves reversely from the diverging electrode edge portion 112 or 114 away from the gap plate centerline 110 and outwardly from the longitudinal axis of the electrode 84 or 86. The arcuate edge surface 100 or 102 also includes another portion 120 or 122 which continues from the portion 116 or 118 and extends away from the gap plate centerline 110 with curvature toward the longitudinal axis of the electrode 84 or 86 so that the varying tangential direction of the edge portion 120 or 122 is displaced from the electrode longitudinal centerline or the centerline 130 by an angle greater than 180°. The arcuate edges 100 and 102 thus diverge from each other and then converge toward each other and toward the peripheral point intersected by the plate centerline 130. As will subsequently become more apparent, the electrode edge curving just described promotes high arc resistance and voltage drop and circumferential or peripheral arc stretching in the chamber 90. By "circumferential" or "peripheral" arc stretching, it is meant herein to refer to arc stretching which is achieved substantially about the circumference or periphery of the gap.

To provide for mechanical stability, the rivet 92 is located substantially on reference line 119 which extends through the sparkover gap 104 centrally of its longitudinal dimension and preferably through the center of rotation of the electrode 84 or 86. The gap electrode separating forces generated during the early arc sparkover period thus are directed against the electrodes 84 and 86 with little net force moment on the electrodes 84 and 86 about the rivet 92 as a pivot. For added assurance against electrode pivotal movement, gap plate top and bottom side projections 123 and 124 can be interlocked with openings 126 and 128 in the electrodes 84 and 86 respectively. This interlock arrangement thus also aids in the gap electrode placement.

As can be determined by comparing FIGS. 4 and 5 or FIGS. 14 and 15, it is preferred that the top side gap plate structure and the bottom side gap plate structure employed for locating the gap electrodes 84 and 86 and the runner electrode 88 be angularly displaced from each other so that in the stack 55 (FIG. 1) the overall current path spirals about and along the vertical stack axis through the electrodes 84 and 86 and the sparkover gaps 104 which also spiral about the vertical stack axis from plate 56 to plate 56. With spiraling sparkover gaps 104, thermal shock to the gap plates 56 is minimized.

The runner electrode 88 is provided between the top side 76 and the bottom side 78 of adjacent gap plates 56 so as to cooperate with the electrodes 84 and 86 in promoting peripheral or circumferential arc stretching in the arc chamber 90. For this purpose, the electrode 88 is provided in electrical floating relation with the electrodes 84 and 86 and operates as an arc runner.

Generally, the runner electrode 88 is also flat and elongated with its longitudinal axis coincident with reference centerline 130 of the gap plate 56. Its edge contour is boat-shaped in the longitudinal direction and, more specifically, includes arcuate portions 132 and 134 which curve outwardly toward the gap plate periphery from tip portion 136 and generally outwardly from the longitudinal axis of the runner electrode 88. Arcuate portions 138 and 140 continue from the arcuate portions 132 and 134 in an outward direction from the electrode tip portion 136 but curve reversely toward the longitudinal axis of the runner electrode 88 and convergingly toward each other to opposite tip portion 142. As observed in FIG. 14, the inmost tip portion 136 is located substantially at the intersection of the centerlines 110 and 130 so as to be disposed in proximity to outer portions 144 and 146 of the diverging gap electrode surface portions 112 and 114 for arc transfer therefrom during the arc stretching process.

The runner electrode 88 need not be secured to either of adjacent gap plates 56, but if securance is desired, suitable means (not shown) can be employed for this purpose. In this instance, the runner electrode 88 is simply indexed in place by means of a gap plate projection 148 extending upwardly from the gap plate top side 76 to interlock with the runner electrode 88 in electrode opening 150. In addition, vertically spaced gap plate top and bottom side wall surfaces 152 and 154 are generally contoured in conformity with the runner electrode edge portions 132, 138, 134 and 140 to prevent the runner electrode 88 from pivoting about the plate projection 148.

Figure 15:
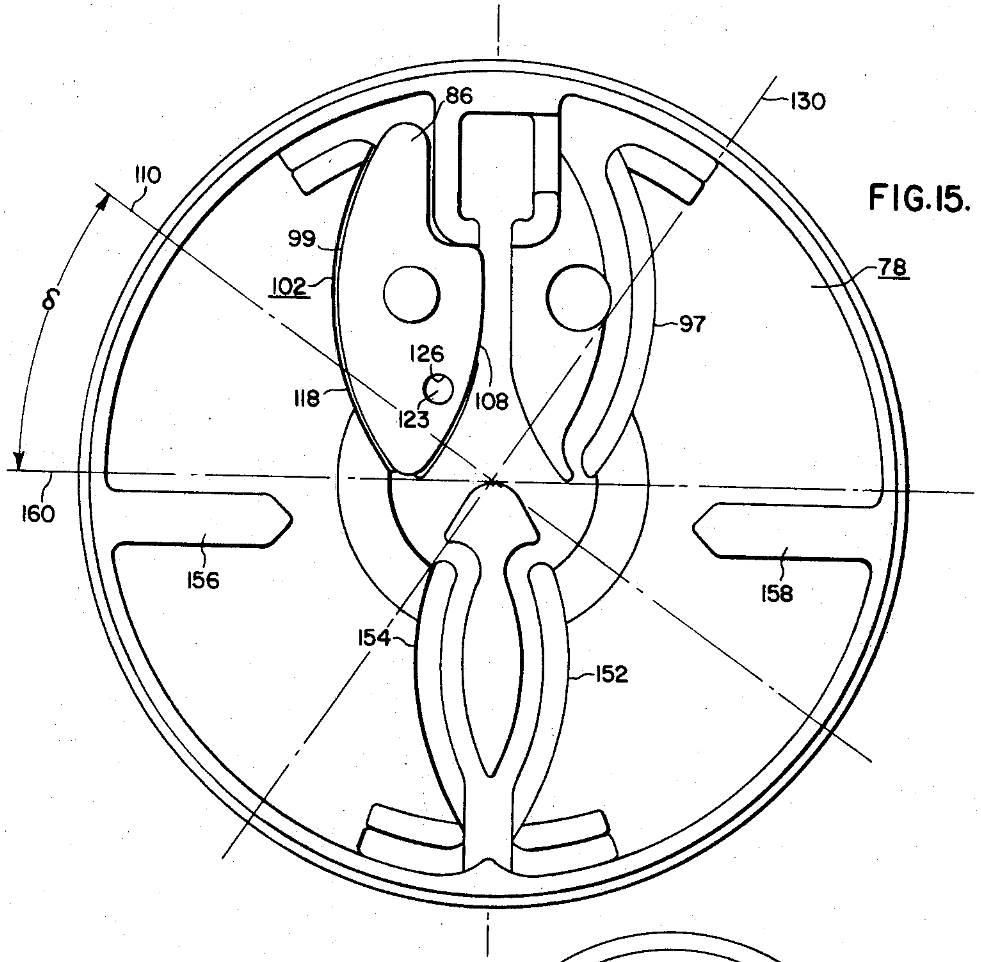
FIG. 15 shows a bottom plan view of the gap plate of FIG. 4 with a gap electrode secured thereto.

Arc splitter walls 156 and 158 (FIG. 15) are provided in generally parallel relationship with reference centerline 160 which, for reasons already considered, is angularly displaced (by 49° in this case) from the reference line 110 as indicated by the reference indicator in FIG. 15. The splitter walls 156 and 158 are provided in this case on the bottom side 78 of each gap plate 56, and slots 162 and 164 are provided in the top side 76 of each gap plate so that a corresponding interfit is provided between adjacent gap plates 56. The splitter walls 156 and 158 provide arc bowing and thus added arc lengthening in the chamber 90. In addition, during the manufacturing process the walls 156 and 158 and the slots 162 and 164 provide an inherent keying arrangement for locating adjacent gap plates 56 relative to each other such that the electrodes 84 and 86 are positioned in relation to each other as observed in FIG. 14.

Figures 4, 12:
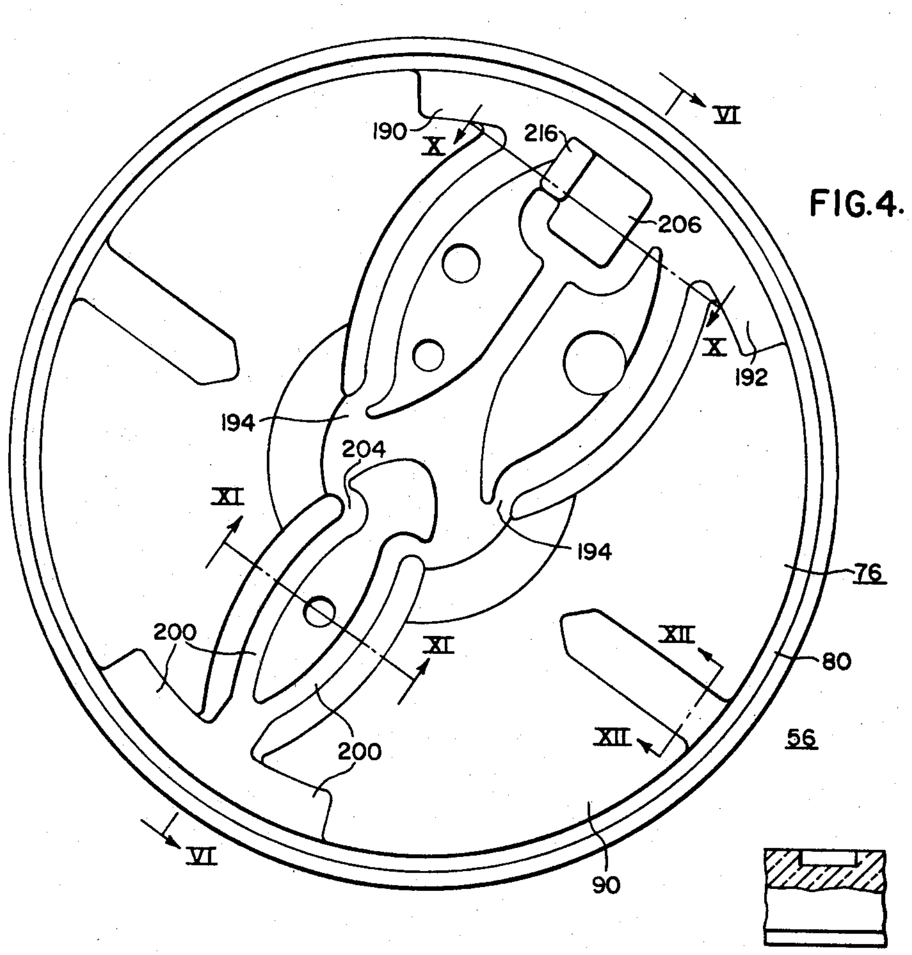
FIG. 4 is a top plan view of a gap plate employed in the gap unit of FIG. 1.
FIG. 12 shows a portion of a section taken along reference line XII—XII of FIG. 4.
Figure 6:
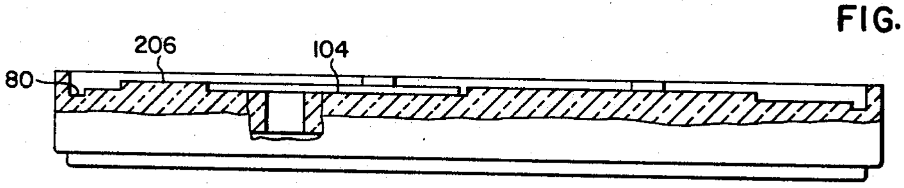
FIG. 6 is an end view of the gap plate partly in section taken along reference line VI—VI of FIG. 4.
Figure 10:
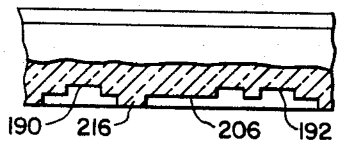
FIG. 10 shows a portion of a section taken along reference line X—X of FIG. 4.
Figure 11:
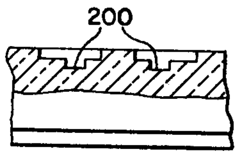
FIG. 11 shows a portion of a section taken along reference line XI—XI of FIG. 4.

In operation, when an overvoltage develops across the stack 55, sparkover occurs in the gap 104 between the electrodes 84 and 86 between each pair of adjacent gap plates 56 as indicated by the reference character 166 in FIG. 4. As magnetic drive force is applied to the arc 166, it diverges along the confronting electrode edge surfaces 112 and 114 toward the runner electrode 88 as indicated by the reference character 168.

Continued magnetic drive force stretches the arc 168 outwardly in the arc chamber 90 until it traverses the interelectrode gap space to flow through the runner electrode 88 and thus be divided into two halves as indicated by the reference characters 170 and 172. With continued drive, further outward stretching arc movement occurs with arc feet 174 and 176 moving along electrode arcuate portions 116 and 118 respectively and with arc runner points 178 and 180 traversing along runner electrode surface portions 132 and 134 until the arc is stretched as indicated by the reference character 182.

At this point, the splitter walls 156 and 158 bow the arc until the arc feet 174 and 176 advance nearly to the plate periphery adjacent the rearmost extent of the arcing surface portions 120 and 122 at which time the arc is provided with nearly peripheral or circumferential length as indicated by the reference character 184. The fact that the gap electrode arcing surfaces 101 and 103 curve as described, to provide gap electrode arc foot travel through the angle in excess of 180°, permits the circumferential arc stretching to be achieved. The fact that the electrode arcuate edge surfaces 116 and 118 and 132 and 134 and the electrode edge surfaces 120 and 122 and 138 and 140 provide respective correlated arc foot paths which first curve outwardly away from the associated electrode longitudinal axis, and toward the gap plate circumference, and then curve inwardly towards the associated electrode longitudinal axis promotes the permitted circumferential stretching of the arc. Thus, electrode surfaces 116 and 132 and 120 and 138 or electrode surfaces 118 and 134 and 121 and 140 provide for arc movement of generally concentrically increasing arc length relative to the center point of the gap plate circumference.

As the arc stretches in the manner indicated, arc resistance and voltage drop increases because of the increasingly longer arc path and because of cooling effects provided in the chamber 90. When the arc is sufficiently or fully stretched, total arrester resistance becomes sufficiently high to result in arc extinguishment.

Figures 5, 7:
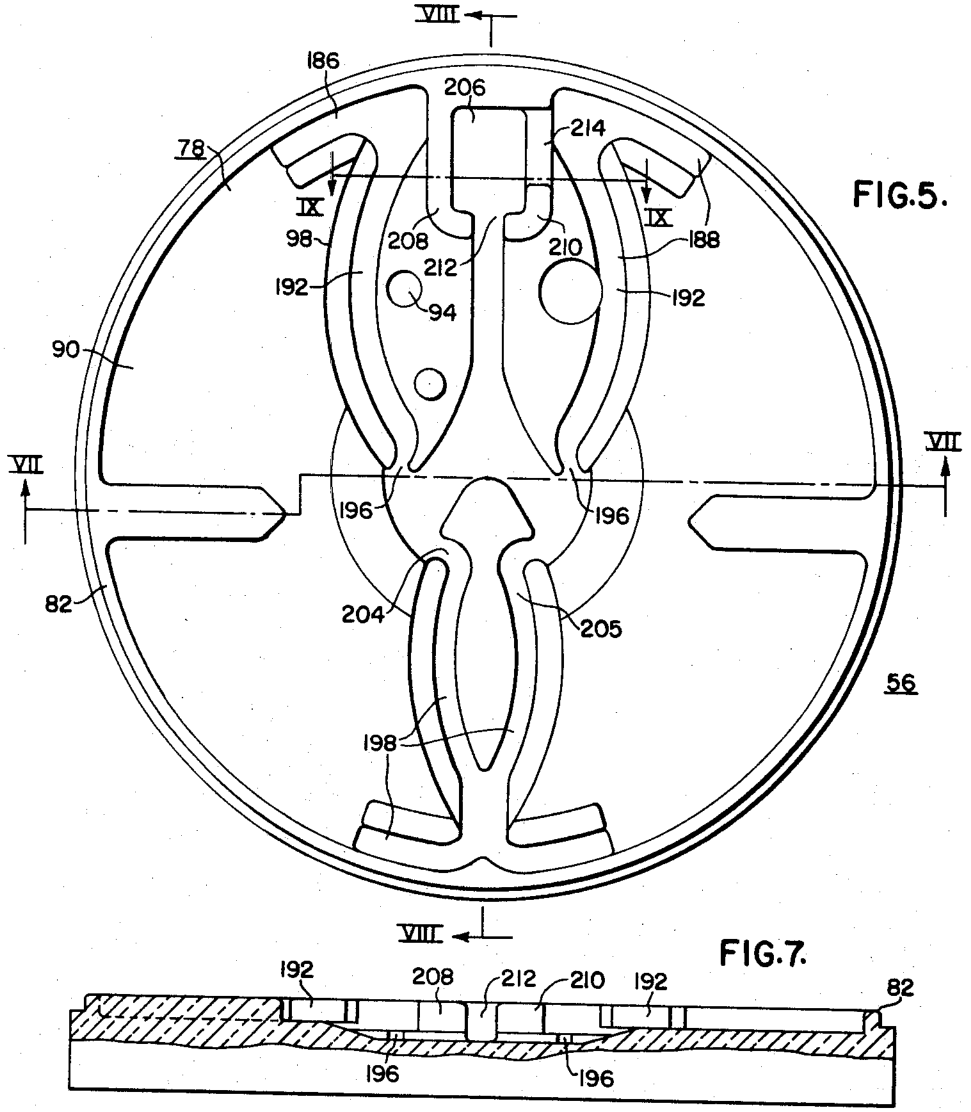
FIG. 5 is a bottom plan view of the gap plate shown in FIG. 4.
FIG. 7 is another end view of the gap plate partly in section taken along reference line VII—VII of FIG. 5.
Figure 8:
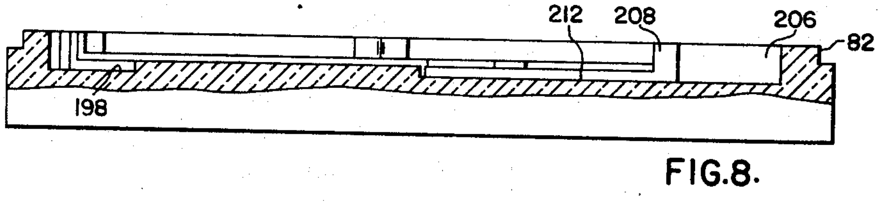
FIG. 8 is similar to FIG. 7 but taken along reference line VIII—VIII of FIG. 5.
Figure 9:
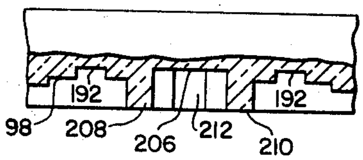
FIG. 9 shows a portion of a section taken along reference line IX—IX of FIG. 5.

Extensive arc cooling occurs because of the extensive gap plate heat transfer surface area to which the arc is exposed in its stretching movement. Heated and "conductive" gas or preferably nitrogen is thus cooled to some extent as it expands ahead of the arc and, although other circulation means can be employed, the heated air is preferably recirculated through recirculation channel means 186 and 188 (FIG. 5) and 190 and 192 (FIG. 4) above and below the electrodes 84 for re-entry into the arc chamber 90 through ports 194 (FIG. 4) and 196 (FIG. 5). Similarly, recirculation is provided through channel means 198 (FIG. 5) and 200 (FIG. 4) above and below the runner electrode 88 for re-entry into the arc chamber 90 through discharge ports 204 and 205. Preferably the discharge ports just described are generally directed toward the gap plate circumference for the purpose of promoting circumferential arc stretching. To promote the functioning of the recirculation means and to prevent external flashover, the plate ridge 82 and plate groove 80 interfit is preferably reasonably tight as previously described but it can be sealed if desired.

Since the recirculation flow passages or channels are directed over and under substantial heat transfer electrode surface areas, the recirculated gas or air is cooled to a "nonconductive" state as it re-enters the arc chamber 90 to aid in arc extinguishment. If desired, suitable material (not shown) can be provided in the recirculation channels for gas filtering purposes.

It is noted also that the recirculated gas or air in the channel means 186, 188, 190 and 192 by-passes the sparkover gap 104 so as to avoid renewed sparkover. An expansion chamber 206 which is bounded by bottom side gap walls 208 and 210 provides for pressure expansion from the sparkover gap 104 through channel 212 during the period of initial sparkover while substantially preventing recirculation air from flowing through channel 212 into the sparkover gap 104.

The expansion chamber wall 210 is provided with a notch 214 extending upwardly from the bottommost side of the wall 210. Extending upwardly from the top side 76 of the next lower gap plate 56 is an electrode locating projection 216 which extends into the notch 214 leaving a small or tolerance space through which a limited amount of recirculation air can flow into the chamber 206. The recirculation air which does enter the chamber 206 in the manner indicated is swirled into turbulence and thus acts as a substantial check or restriction against any major flow of recirculation air into the chamber 206 and through the channel 212 into the sparkover region 104. It is also noted that the gap electrodes 84 and 86 are each provided with a notch 218 which conforms in contour to the wall 208 or 210 which thus provide mechanical stability for the electrodes 84 and 86 and in addition prevent sparkover between the gap electrodes 84 and 86 between the region 104 and the rearwardly adjacent portion of the plate periphery.

Magnetic drive force for the respective arcs in the arc chambers 90 formed by the gap plates 56 in the stack 55 is provided by magnetic means arranged in relation to the stack 55 so as to provide an axially directed magnetic flux pattern. Preferably, the magnetic flux is produced by the one or more magnetic drive coil units 62 or 64 previously referred to in connection with FIG. 1. In this instance, the coil unit 62 is disposed adjacent the top of the stack 55 while the coil unit 64 is disposed adjacent the bottom of the stack 55. Other dispositions of coil units within the stack 55 can be provided according to design needs.

The magnetic gap unit 62 or 64 comprises a coil form 220 (FIG. 21) which is generally in the form of a spool having flanges 222 and 224 (FIG. 19) on opposite spool sides 221 and 227 for retaining a coil winding 225 of the desired number of turns. An inner end 223 of the winding 225 is extended through a suitable spool slot (not shown) for engagement with eyelet or other conductive securance means 226 secured through opening 228 in flat spool wall 230 from which spokes 232 project to one spool side 221 for strengthening purposes. The outer end 229 of the winding 225 is extended through slot 234 (FIG. 21) and engaged by eyelet 236 or other conductive securance means adjacent the spool side 221. The eyelet 236 can also secure terminal plate 235 (FIG. 20) on the spool side 221 so as to provide for gap connection to end plate 52 or 54 in the arrester circuit.

On the opposite side 227 of the coil form 220, a cavity 231 is provided with the inmost surface of the cavity 231 formed by the spool wall 230. Within the cavity 231 there are preferably provided a pair of coiled electrodes 242 and 244 which are disposed for initial sparkover in gap 63 on surge voltage lower than the winding insulation strength. Arc stretching occurs outwardly to points 250, 252, and 254.

The coil electrode 244 is engaged with the eyelet 236 so as to be connected to the inner end 223 of the winding 225, and the coiled electrode 242 is connected through the eyelet 226 to the outer end 229 of the winding 225. The coiled electrodes 242 and 244 thus are in electrical parallel with the winding 225 and are the preferred means for providing surge protection for the winding 225 during periods of rapid voltage rise or fall when the impedance of the winding 225 is relatively high. Other surge protection means, such as shunt resistance or a normal gap in the stack 55, can be provided if desired.

At or near power frequency, the impedance of the winding 225 is relatively low and power follow current thus normally flows through the winding 225 and bypasses the coiled gap electrodes 242 and 244 after the initial voltage surge arc between the coiled gap electrodes 242 and 244 is extinguished. Magnetic drive provides for extinguishing the coiled electrode arc through an arc stretching process, and the drive is obtained from self-produced flux since the electrode current is substantially perpendicular to the arc in the region of the arc feet as the arc stretches outwardly to the points 250, 252 and 254.

Each magnetic drive coil unit 62 or 64 is connected to a special gap plate 58 or 60 for assembly in the stack 55. In FIG. 19, there is shown a subassembly of the coil unit 62 and the gap plate 58 which has a bottom side 59 provided with structure identical with the structure provided on the bottom side 78 of the gap plate 56 in FIG. 15. Its top side 57 (FIG. 16) is generally flat but has recesses 71 and 73 respectively for the eyelets 226 and 236. An electrical connection is established between the electrode 86 (see FIG. 15) of the gap plate 58 and coiled electrode 242 of the magnetic drive coil unit 220 by suitable conductive securance means such as rivet 260 (FIG. 23) which extends through the electrode 86 and the eyelet 226 for engagement therewith. Simultaneously, the rivet 260 mechanically secures the coil unit 62 and the gap plate 58 together. When so connected, a circuit path as indicated by junction 261 (FIG. 3) is provided by the eyelet 226 between the winding 225 or 62*a* and the protective gap 63 or 63*a* with the gap plate 58*a*. Junction 263 is formed by the eyelet 236 as previously described.

The bottom special gap plate 60 is connected to the bottom magnetic drive coil unit 64 in a manner similar to that described for the plate 58 and unit 62. However, in this case the special gap plate 60 is provided with a top side 61 (FIG. 1) having structure identical with the top side 76 of the gap plate 56 shown in FIG. 14.

With slight modification, the magnetic drive coil unit 62 or 64 can be combined with special gap plates 58 and 60 or other gap plate means located on its top and bottom sides respectively so as to be adapted for assembly at various intermediate points at the height of the stack 55. As one example, magnetic drive coil units 62 or 64 can be placed at the one-quarter and three-quarter points in the height of the stack 55. Other locations and arrangements of one, two or more magnetic drive coil units 62 or 64 can be provided as desired.

In brief summary of the invention there is provided an arrester magnetic blowout gap in which gap plate and electrode structure is efficiently organized to provide relatively high resistance and high voltage drop arc properties. These properties are derived from the character of the arc stretching achieved and through efficient cooling achieved in the gap. As a consequence of the improved magnetic blowout gap operation, a lightning arrester in which the gap is employed is subjected to relatively lower thermal duty and can be provided with relatively smaller size, particularly since power follow current is limited in magnitude and in duration by the high arc resistance and voltage drop. The magnetic blow-out gap assembly can reduce arrester block duty requirements to one-tenth (or less) that of the normal duty requirements of a standard gap assembly.

For purposes of performance comparison, in FIGS. 25 and 26 there are shown respective curves indicating voltage and current operation of the gap 50 and in FIG. 24 there is shown a curve indicating voltage and current operation of a standard prior art gap. In the standard gap, gap current flows as indicated by the reference character 270 when an overvoltage appears on the line, in this case at some point 272 in a negative half-cycle of power voltage. After the overvoltage condition is corrected, the gap current comprises power follow current as indicated by the reference character 274 which flows until power voltage zero as indicated by the reference character 276 at which time the gap arc is extinguished and gap current goes to zero.

In contrast, when an overvoltage appears on a line to which the arrester gap 50 is connected, gap current flows for a relatively short period of time as indicated by the reference character 280 in this instance approximately one-sixth of the time duration of the power voltage half-cycle, while line or arrester voltage builds up as indicated by the reference character 278 or 284. Power follow current is thus effectively limited in magnitude and in duration because of the relatively substantial arc voltage drop achieved as indicated by the reference character 284 in contrast to very limited arc voltage drop 286 (FIG. 24) provided in the standard prior art gap.

As a further illustration of the performance of the gap 56, the curve in FIG. 26 shows the current and voltage conditions which occur for example when a voltage transient requires the arrester to discharge energy trapped on an alternating current line, or to interrupt direct current. System voltage first rises rapidly to gap sparkover (not observable at time sweep of FIG. 26). After sparkover, the gap develops resistance as shown by its voltage drop indicated by reference character 288 and discharges current as indicated by the reference character 290. The arrester circuit is interrupted in a relatively short period of time as indicated by the reference character 292 by reason of the arc voltage drop and resistance, and the gap voltage flattens out as indicated by the reference character 294 and within a short period of time (say several line-time constants) oscillates to generally successively lower values as generally indicated by the reference characters 295 and 296 as the line capacitance discharges its stored charge.

The foregoing disclosure has been presented only to illustrate the principles of the invention. Accordingly, it is desired that the invention be not limited by the embodiments described, but, rather, that it be accorded an interpretation consistent with the scope and spirit of its broad principles.

What is claimed is:

1. An arrester gap comprising a stack of insulative gap plates, each of said gap plates having a gap electrode secured on opposite sides thereof, means conductively connecting the gap electrodes associated with each of said plates, each adjacent pair of said gap plates formed to provide an arc chamber, the gap electrodes of the confronting plate sides being generally flat and elongated with the longitudinal axes thereof extending at generally parallel relation inwardly from spaced gap plate peripheral points toward a reference plate centerline, said gap electrodes having respective arcing surfaces, said arcing surfaces having respective confronting generally parallel portions disposed to provide a sparkover region, said arcing surfaces further having respective portions diverging away from each other and extending away from said sparkover region toward said reference centerline, said arcing surfaces additionally having respective arcuate portions extending from said diverging portions and away from said reference centerline generally toward the associated plate peripheral point, a generally flat and elongated arc runner electrode disposed between each pair of said gap plates with its longitudinal axis generally aligned with and disposed approximately midway between the longitudinal axes of said gap electrodes, said runner electrode having an inmost portion spaced from said gap electrode diverging portions, said runner electrode further having opposite arcing surfaces having first portions extending from said inmost runner and electrode portion and away from said reference plate centerline and said gap electrodes and away from each other, said runner electrode arcing surfaces having second portions extending from said first portions toward the plate periphery and converging toward each other, and means for directing substantially nonconducting gas into said arc chamber.

2. An arrester gap comprising a stack of insulative gap plates, each of said gap plates having a gap electrode secured on opposite sides thereof, means conductively connecting the gap electrodes associated with each of said plates, each adjacent pair of said gap plates formed to provide an arc chamber, the gap electrodes of the confronting plate sides being generally flat and elongated with the longitudinal axes thereof extending in generally parallel relation inwardly from spaced gap plate peripheral points toward a reference plate centerline, said gap electrodes having respective arcing surfaces, said arcing surfaces having respective confronting generally parallel portions disposed to provide a sparkover region, said arcing surfaces further having respective portions diverging away from each other and extending away from said sparkover region toward said reference centerline, said arcing surfaces additionally having respective arcuate portions extending from said diverging portions and reversely away from said reference centerline generally toward the associated plate peripheral point, arc runner electrode means disposed between each pair of said gap plates and in spaced relation to the associated gap electrodes so as to promote substantial arc lengthening between the arcing surfaces of the associated gap electrodes, arc splitter means disposed in proximity to the plate periphery and said reference plate centerline to promote arc lengthening, and means for directing substantially non-conductive gas into said arc chamber.

3. An arrester gap comprising a stack of insulative gap plates, each of said gap plates having a gap electrode secured on opposite sides thereof, means conductively connecting the gap electrodes associated with each of said plates, each adjacent pair of said gap plates formed to provide an arc chamber, the gap electrodes of the confronting plate sides being generally flat and elongated with the longitudinal axes thereof extending at generally parallel relation inwardly from spaced gap plate peripheral points toward a reference plate centerline, said gap electrodes having respective confronting generally parallel portions disposed to provide a sparkover region, said arcing surfaces further having respective portions diverging away from each other and extending away from said sparkover region toward said reference centerline, said arcing surfaces additionally having respective arcuate portions extending from said diverging portions and away from said reference centerline generally toward the associated plate peripheral point, a generally flat and elongated arc runner electrode disposed between each pair of said gap plates with its longitudinal axis generally aligned with and disposed approximately midway between the longitudinal axes of said gap electrodes, said runner electrode having an inmost portion spaced from said gap electrode diverging portions, said runner electrode further having opposite arcing surfaces having first portions extending from said inmost runner electrode portion and away from said reference plate centerline and said gap electrodes and away from each other, said runner electrode arcing surfaces having second portions extending from said first portions toward the plate periphery and converging toward each other, and arc splitter plate wall members oppositely disposed in proximity to the plate periphery and said reference plate centerline to promote further arc lengthening, said splitter plate wall members interfitting with respect to plate slots to key adjacent gap plates in relation to each other, and means for directing substantially nonconductive gas into said arc chamber.

4. An arrester gap comprising a stack of insulative gap plates, each of said gap plates having a gap electrode secured on opposite sides thereof, means conductively connecting the gap electrodes associated with each of said plates, each adjacent pair of said gap plates formed to provide an arc chamber, the gap electrodes of the confronting plate sides being generally flat and elongated with the longitudinal axes thereof extending at generally parallel relation inwardly from spaced gap plate peripheral points toward a reference plate centerline, said gap electrodes having respective arcing surfaces, said arcing surfaces having respective confronting generally parallel portions disposed to provide a sparkover region, said arcing surfaces further having respective portions diverging away from each other and extending away from said sparkover region toward said reference centerline, said arcing surfaces additionally having respective arcuate portions extending from said diverging portions and away from said reference centerline generally toward the associated plate peripheral point, a generally flat and elongated arc runner electrode disposed between each pair of said gap plates and with its longitudinal axis generally aligned with and disposed approximately midway between the longitudinal axes of said gap electrodes, said runner electrode having an inmost portion spaced from said electrode diverging portions, said runner electrode further having opposite arcing surfaces having first portions extending from said inmost runner and electrode portion and away from said reference plate centerline and said gap electrodes and away from each other, said runner electrode arcing surfaces having second portions extending from said first portions toward the plate periphery and converging toward each other, and means for recirculating arc heated gas from said arc chamber over at least one of said electrodes for re-entry into said arc chamber without renewed sparkover in said sparkover region.

5. An arrester gap comprising a stack of insulative gap plates, each of said gap plates having a gap electrode secured on opposite sides thereof, means conductively connecting the gap electrodes associated with each of said plates, each adjacent pair of said gap plates formed to provide an arc chamber, the gap electrodes of the confronting plate sides being generally flat and elongated with the longitudinal axes thereof extending at generally parallel relation inwardly from spaced gap plate peripheral points toward a reference plate centerline, said gap electrodes having respective arcing surfaces, said arcing surfaces having respective confronting generally parallel portions disposed to provide a sparkover region, said arcing surfaces further having respective portions diverging away from each other and extending away from said sparkover region toward said reference centerline, said arcing surfaces additionally having respective arcuate portions extending from said diverging portions and away from said reference centerline generally toward the associated plate peripheral point, a generally flat and elongated arc runner electrode disposed between each pair of said gap plates and with its longitudinal axis generally aligned with and disposed approximately midway between the longitudinal axes of said gap electrodes, said runner electrode having an inmost portion spaced from said gap electrode diverging portions, said runner electrode further having opposite arcing surfaces having first portions extending from said inmost runner and electrode portion and away from said reference plate centerline and said gap electrodes and away from each other, said runner electrodes arcing surfaces having second portions extending from said first portions toward the plate periphery and converging toward each other, and plate channel means having portions thereof extending longitudinally of each flat side of each of said electrodes for recirculating and cooling arc heated chamber gas for re-entry into said chamber without renewed sparkover in said sparkover region.

6. An arrester gap as set forth in claim 5 wherein said channel means are so arranged as to discharge the recirculation flow into said chamber generally in a direction toward the plate periphery.

7. A lightning arrester spark gap comprising at least two insulating plates disposed in a stack to form an enclosed space between them, a pair of gap electrodes in said space positioned at one side of the center of the plates and disposed to provide a sparkover region between them, said electrodes having arcing surfaces diverging from the sparkover region toward the center of the plates, an electrically floating arc runner electrode disposed between the plates at the other side of the center thereof, said arc runner electrode extending across the space between the plates toward the gap electrodes and terminating in the space between the diverging surfaces of the gap electrodes, said plates having channel means therein for circulation of gas during arcing between the electrodes, said channel means communicating with said enclosed space adjacent the periphery of the plates and extending generally radially between the plates and each of the electrodes toward the electrode tips and having discharge ports remote from said sparkover region and directed away from the sparkover region.

8. A spark gap as defined in claim 7 in which the plates are formed to provide an expansion chamber for heated gas adjacent the sparkover region.

9. A spark gap as defined in claim 7 in which the gap electrodes and the arc runner electrode extend generally parallel to a diameter of the plates and the plates are formed to provide a generally radial arc splitter at each side of the electrodes, and said discharge ports direct gas discharged therefrom toward the splitters.

10. A lightning arrester spark gap comprising at least two insulating plates disposed in a stack to form an enclosed space between them, a pair of electrodes in said space positioned at one side of the center of the plates and disposed to provide a sparkover region between them, said electrodes having arcing surfaces diverging from the sparkover region toward the center of the plates, and an electrically floating arc runner electrode disposed between the plates at the other side of the center thereof, said arc runner electrode extending across the space between the plates toward the space between the diverging surfaces of the first-mentioned electrodes and having outwardly curving arcing surfaces, and said plates being formed to provide generally radial arc splitter elements at opposite sides of the electrodes.

11. A lightning arrester spark gap comprising at least two insulating plates disposed in a stack to form an enclosed space between them, a pair of electrodes in said space positioned at one side of the center of the plates and disposed to provide a sparkover region between them, said electrodes having arcing surfaces diverging from the sparkover region toward the center of the plates, and an electrically floating arc runner electrode disposed between the plates at the other side of the center thereof, said arc runner electrode extending across the space between the plates toward the space between the diverging surfaces of the first-mentioned electrodes and having outwardly curving arcing surfaces, the gap electrodes and the arc runner electrode extending generally parallel to a diameter of the plates, and the plates being formed to provide a generally radial arc splitter element at each side of the electrodes extending generally perpendicular to said diameter.

References Cited

UNITED STATES PATENTS

| | | | |
|---|---|---|---|
| 2,807,751 | 9/1957 | Nilsson | 315—36 |
| 3,076,114 | 1/1963 | Hicks | 313—231 |
| 3,259,780 | 7/1966 | Stetson | 315—36 |

S. D. SCHLOSSER, *Primary Examiner.*

JAMES W. LAWRENCE, *Examiner.*